United States Patent Office 3,168,551
Patented Feb. 2, 1965

3,168,551
1-ACYL-2-TRICYANOVINYLARYLHYDRAZINES
AND PRODUCTION THEREOF
John Richard Roland, Wilmington, Del., assignor to E. I.
du Pont de Nemours and Company, Wilmington, Del.,
a corporation of Delaware
No Drawing. Filed Feb. 9, 1962, Ser. No. 172,109
9 Claims. (Cl. 260—465)

This invention is concerned with a new class of dyes and more particularly with acyltricyanovinylarylhydrazines.

This application is a continuation-in-part of my copending application Serial No. 754,917, filed August 14, 1958, now abandoned.

In U.S. Patents 2,762,810 and 2,762,833 there are shown processes for preparing C-tricyanovinyl compounds particularly C-tricyanovinyl aromatic amines and C-tricyanovinyl phenols. These C-tricyanovinyl compounds are highly colored and are useful for dyeing such materials as polyacrylonitrile and polyethylene terephthalate fibers when applied from neutral or acidic media. Dyes which are stable for application to such fibers from alkaline media are continually being sought.

An object of the present invention is to provide a new class of tricyanovinyl dyes which are characterized by improved stability for application under alkaline conditions. Other objects will be apparent from the description of the invention given hereafter.

The above objects are accomplished according to this invention by reacting tetracyanoethylene with selected 1,2-disubstituted hydrazines as more fully characterized below to form a novel class of dyes.

The reaction of tetracyanoethylene with hydrazine structures has been found to give varied and unpredictable results depending on the specific hydrazine structure. For example, Middleton U.S. 2,836,606 has shown that tetracyanoethylene reacts with hydrazine itself to yield salts of 1,1,2,5,6,6 - hexacyano - 3,4, - diazahexadiene. In Dickinson and Middleton U.S. 2,998,419, issued August 29, 1961, it is shown that tetracyanoethylene reacts with monosubstituted hydrazines (in which the substituent is bonded to hydrazine nitrogen by carbon) to yield the corresponding 1-substituted-5-amino-3,4-dicyanopyrazoles.

It has now been found that a new class of dyes, the 1-acyl-2-tricyanovinylarylhydrazines, can be prepared by reaction of tetracyanoethylene with the corresponding 1-acyl-2-arylhydrazine. The process and products of this invention may be indicated as follows:

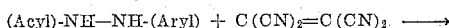
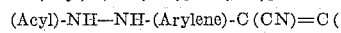

(Acyl)-NH—NH-(Aryl) + C(CN)₂=C(CN)₂ ⟶

(Acyl)-NH—NH-(Arylene)-C(CN)=C(CN)₂ + HCN in which the acyl group is an organic radical derived from a carboxylic or organic sulfonic acid by removal of the acid hydroxyl group, and the arylene group is a monocyclic or multicylic benezenoid group.

The reaction of this invention can be carried out by bringing tetracyanoethylene and an acylarylhydrazine into intimate contact. This may be accomplished simply by grinding the reactants together in a mortar. However, to shorten the reaction time, it is preferred to carry out the reaction in the presence of a liquid diluent which is inert to the reactants and products. As liquid diluents there can be employed polar compounds such as, for instance, N,N - dimethylformamide, N,N - diethylformamide, N-methylformanilide, N-methylformamide, formamide, N-methyl-N-ethylacetamide, N,N - dimethylacetamide, N,N-diethylacetamide, tetramethylurea, tetraethylurea, pyridine, dimethylsulfoxide, N - nitrosodimethylamine, and mixtures of these liquids. The dialkyl lower alkanoamides are the preferred class of solvents.

The reaction of tetracyanoethylene with an acylarylhydrazine may be carried out over a wide range of temperatures, such as from −80° C. and below to 100° C. and above. Reaction temperatures in the range of −20° to +60° C. are preferred.

Pressure is not a critical factor in this process, and atmospheric pressure is accordingly preferred.

It is preferred to employ approximately equimolecular quantities of tetracyanoethylene and the acylarylhydrazine. However, the reaction will take place when the reactants are brought together in any proportion, and molar ratios in the range of 1:2 to 2:1 are preferred.

In the following examples parts are by weight. Example III represents a preferred embodiment of the invention.

EXAMPLE I

A solution of 50 parts of 1-benzoyl-2-phenylhydrazine in 95 parts of dimethylformamide is stirred and warmed at 40–45° C. while adding 30 parts of tetracyanoethylene in small portions. The addition requires about 12 minutes. The reaction mixture is poured onto 1000 parts of well-stirred, finely ground ice. After the ice melts, the water is decanted from a precipitated tar. The tar is induced to crystallize by trituration with alcohol, filtered, and recrystallized from ethyl alcohol. This yields 43 parts (58% of the theoretical) of 1-benzoyl-2-(4-tricyanovinylphenyl)hydrazine in the form of a bright orange, needielike solid that melts on a melting point block at 259–260° C. with decomposition. The melting point appears somewhat dependent on rate of heating. This dye has an absorption maximum at 467 millimicrons with a molecular extinction coefficient of 29,800.

Analysis.—Calcd. for $C_{18}H_{11}N_5O$: C, 69.0; H, 3.52; N, 22.4. Found: C, 69.02; H, 3.51; N, 21.49.

EXAMPLE II 1-formyl - 2 - (4-tricyanovinylphenyl)hydrazine is prepared by adding 128 parts of tetracyanoethylene to a solution of 136 parts of 1-formyl-2-phenylhydrazine in 236 parts of dimethylformamide. The tetracyanoethylene is added to the solution at 25–30° C. with stirring over a period of 15 minutes. The reaction mixture is stirred at room temperature for an additional 15 minutes, after which it is poured onto 3000 parts of well-stirred, finely ground ice containing 100 parts of glacial formic acid. The precipitate is a mixture of orange-brown crystals and dark-brown tar. The crystals and water layer are decanted after the ice melts and the crystals filtered. Trituration of the tar with formic acid causes it to solidify. The two fractions are recrystallized from ethyl alcohol to yield 22 parts and 23 parts, respectively (17% yield), of 1 - formyl - 2 - (4-tricyanovinylphenyl)hydrazine as a dark orange solid melting on a melting point block at 215–216° C. (dec.). This dye has an absorption maximum at 460 millimicrons with a molecular extinction coefficient of 27,400.

EXAMPLE III

Example II is repeated except that the tetracyanoethylene is added to the solution of 1-formyl-2-phenylhydrazine at 5–10° C. The reaction mixture is worked up as in Example II. This yields 89 parts (37%) of 1-formyl-2-(4-tricyanovinylphenyl)-hydrazine melting on a block at 215–216° C. (dec.).

Analysis.—Calcd. for $C_{12}H_7N_5O$: N, 29.5. Found: N, 29.51.

EXAMPLE IV

A solution of 1300 parts of 1-acetyl-2-phenylhydrazine in 2834 parts of dimethylformamide is stirred at 5–10° C. while adding 1110 parts of tetracyanoethylene over a period of 15 minutes. The reaction mixture is allowed to stand in an ice bath overnight. The product is precipitated by pouring the above solution into a well-stirred mixture of 40,000 parts of ice and water. The precipitated product is mixture of bright orange tar and fine orange needles. After the ice melts, the needles are decanted with the supernatant water. The needles are collected on a filter and recrystallized from butyl alcohol. This yields 160 parts of 1-acetyl-2-(4-tricyanovinylphenyl)hydrazine melting at 269–270° C. The residual orange tar is triturated with glacial acetic acid. The resulting solid is then filtered. The solid product is successively extracted with boiling ethyl alcohol and boiling N-butyl alcohol and the extracts allowed to crystallize. This yields a total of 945 parts of 1-acetyl-2-(4-tricyanovinylphenyl)hydrazine as a bright orange solid melting at 270–271° C. Precipitation of the acetic acid filtrate yields an additional 80 parts of only slightly impure material melting at 268–270° C. The combined yield is 55% of the theoretical. This dye has an absorption maximum of 467 millimicrons and a molecular extinction coefficient of 29,900.

*Analysis.*—Calcd. for $C_{13}H_9N_5O$: C, 62.2; H, 3.58; N, 27.9. Found: C, 62.60; H, 3.79; N, 27.21.

EXAMPLE V

A solution of 48 parts of 1-(4-toluenesulfonyl)-2-phenylhydrazine in 190 parts of dimethylformamide is cooled in an ice bath. The solution is stirred while adding 23 parts of tetracyanoethylene in small portions so that the temperature does not exceed 5° C. The mixture is allowed to stand in ice overnight after which 1-(4-toluenesulfonyl)-2-(4-tricyanovinylphenyl)hydrazine is precipitated by pouring the mixture onto ice. The precipitated product is crystallized from acetic acid.

Other 1-acyl-2-(tricyanovinylaryl)hydrazines of this invention can be prepared by reacting the corresponding 1-acyl-2-arylhydrazine with tetracyanoethylene in the manner of Example IV.

1-acyl-2-arylhydrazines are prepared by reaction of an acyl halide with an arylhydrazine by the method of Emil Fischer, Ann. 190, 125–6 (1877). This reference shows preparation of 1-benzoyl-2-phenylhydrazine from benzoyl chloride and phenylhydrazine. The 1-acyl-2-arylhydrazines shown in Table I below are prepared by substituting known acyl halides and arylhydrazines in the process of Fischer.

In the starting acylarylhydrazines, for reasons of availability, a preferred class of acyl group is one containing 1–18 carbons, wherein the part of the acyl group other than the carbonyl or sulfonyl group remaining after removal of the acidic hydroxyl group from the corresponding acid is alkyl, perfluoroalkyl, alkenyl, cycloalkyl (including alkylcycloalkyl and cycloalkylalkyl), aryl, alkaryl, aralkyl, heterocyclic, or, when the acyl group is derived from a carboxylic acid, hydrogen; and wherein the part of the group other than the carbonyl or sulfonyl group may be substituted with nitro, dialkylamino, alkoxy, aryloxy, acyloxy, alkoxycarbonyl, halogen, or cyano. An especially preferred class of acyl group, within the limits defined above, is that in which the part of the group other than carbonyl or sulfonyl is hydrogen or hydrocarbon.

It is obvious that the aryl groups in the starting acylarylhydrazines must have a hydrogen capable of reacting with tetracyanoethylene. A preferred class of acylarylhydrazines includes those in which the aryl group has not more than three fused benzene rings, such as phenyl, 1-naphthyl, or 1-anthryl or is heterocyclic, such as 5-quinolyl, or 8-quinolyl, with a hydrogen available in the 4-position of the phenyl, naphthyl, or anthryl groups or in the corresponding 8- or 5-positions of the 5- or 8-quinolyl groups. It is preferred that in these aryl groups at least one of the positions adjacent to the one carrying the hydrogen available for reaction with tetracyanoethylene should also carry a hydrogen atom, and that substituents in the other positions in the ring be restricted to lower alkyl, halogen, lower alkoxy, or a bridge to another ring as in 1-naphthyl, 1-anthryl, 5-quinolyl or 8-quinolyl. A strongly electronegative substituent, such as a nitro group, in the reactive ring interferes substantially with the reaction with tetracyanoethylene and makes it difficult to prepare the corresponding tricyanovinyl derivatives directly. Such substituted derivatives may be prepared by indirect methods. For example, a strongly electronegative group, such as a nitro group, can be introduced by treatment of the corresponding acyltricyanovinylarylhydrazine, as by nitration.

In determining whether a particular hydrogen on an aryl group in an acylarylhydrazine represents a reactive site where tetracyanoethylene will react to introduce a tricyanovinyl group, the general rule is that the tricyanovinyl group will replace a given 4-hydrogen in a benzenoid ring (disregarding any other rings except the one by which the aryl group is attached and numbering from the point of attachment as 1) if that same hydrogen would normally be replaced in a benzenediazonium coupling reaction with benzenediazonium chloride. Introduction of a tricyanovinyl group at position 2 in an aryl ring of an acylarylhydrazine (relative to the point of attachment of the aryl ring as position 1) has not been observed to occur by direct reaction with tetracyanoethylene.

*Table I*

| 1-acyl-2-arylhydrazine | | 1-acyl-2-(4-tricyanovinylaryl)-hydrazine obtained by reaction with tetracyanoethylene |
|---|---|---|
| Acyl group | Aryl group | |
| 3-nitrobenzoyl | Phenyl | 1-(3-nitrobenzoyl)-2-(4-tricyanovinylphenyl)hydrazine. |
| 4-nitrobenzoyl | do | 1-(4-nitrobenzoyl)-2-(4-tricyanovinylphenyl)hydrazine. |
| 4-nitrobenzenesulfonyl | do | 1-(4-nitrobenzenesulfonyl)-2-(4-tricyanovinylphenyl)hydrazine. |
| 3-dimethylaminopropionyl | do | 1-(3-dimethylamino)propionyl-2-(4-tricyanovinylphenyl)hydrazine. |
| 4-dimethylaminobenzoyl | do | 1-(4-dimethylamino)benzoyl-2-(4-tricyanovinylphenyl)hydrazine. |
| 3-dimethylaminobenzoyl | do | 1-(3-dimethylamino)benzoyl-2-(4-tricyanovinylphenyl)hydrazine. |
| Stearoyl | do | 1-stearoyl-2-(4-tricyanovinylphenyl)hydrazine. |
| Cyclopropanecarbonyl | do | 1-cyclopropanecarbonyl-2-(4-tricyanovinylphenyl)hydrazine. |
| Pivaloyl | do | 1-pivaloyl-2-(4-tricyanovinylphenyl)hydrazine. |
| Ethoxypivaloyl | do | 1-ethoxypivaloyl-2-(4-tricyanovinylphenyl)hydrazine. |
| Cyclohexanecarbonyl | do | 1-cyclohexanecarbonyl-2-(4-tricyanovinylphenyl)hydrazine. |
| Alpha-naphthoyl | 1-naphthyl | 1-(alpha-naphthoyl)-2-(4-tricyanovinyl-1-naphthyl)-hydrazine. |
| Furoyl | o-Tolyl | 1-furoyl-2-(2-methyl-4-tricyanovinylphenyl)-hydrazine. |
| Phenylacetyl | m-Tolyl | 1-phenylacetyl-2-(3-methyl-4-tricyanovinylphenyl)-hydrazine. |
| 4-methylbenzoyl | 2-chloro phenyl | 1-(4-methylbenzoyl)-2-(2-chloro-4-tricyanovinylphenyl)hydrazine. |
| 4-isopropylbenzoyl | 3-bromophenyl | 1-(4-isopropylbenzoyl)-2-(3-bromo-4-tricyanovinylphenyl)hydrazine. |
| 2-phenanthrylcarbonyl | (o-Phenyl)phenyl | 1-(2-phenanthrylcarbonyl)-2-(2-phenyl-4-tricyanovinylphenyl)-hydrazine. |
| Methacryloyl | 2-benzylphenyl | 1-methacryloyl-2-(2-benzyl-4-tricyanovinylphenyl)-hydrazine. |
| Trifluoroacetyl | 1-anthryl | 1-trifluoroacetyl-2-(4-tricyanovinyl-1-anthryl)-hydrazine. |
| 2-chlorobenzoyl | Phenyl | 1-(2-chlorobenzoyl)-2-(4-tricyanovinylphenyl)hydrazine. |
| Beta-ethoxypropionyl | o-Methoxyphenyl | 1-beta-ethoxypropionyl-2-(2-methoxy-4-tricyanovinylphenyl)hydrazine. |
| Phenoxyacetyl | Phenyl | 1-phenoxyacetyl-2-(4-tricyanovinylphenyl)hydrazine. |

Table 1—Continued

| 1-acyl-2-arylhydrazine | | 1-acyl-2-(4-tricyanovinylaryl)-hydrazine obtained by reaction with tetracyanoethylene |
|---|---|---|
| Acyl group | Aryl group | |
| Beta-acetoxypropionyl. | Phenyl | 1-beta-acetoxypropionyl-2-(4-tricyanovinylphenyl)-hydrazine. |
| ω-carbethoxyvaleroyl. | do | 1-ω-carbethoxyvaleroyl-2-(4-tricyanovinylphenyl)-hydrazine. |
| Cyanoacetyl | do | 1-cyanoacetyl-2-(4-tricyanovinylphenyl)hydrazine. |
| Acetyl | 2,5-dichlorophenyl. | 1-acetyl-2-(2,5-dichloro-4-tricyanovinylphenyl)-hydrazine. |
| Do | 2,3-dimethylphenyl. | 1-acetyl-2-(2,3-dimethyl-4-tricyanovinylphenyl)-hydrazine. |
| Do | 2,5-dimethylphenyl. | 1-acetyl-2-(2,5-dimethyl-4-tricyanovinylphenyl)-hydrazine. |
| Do | 2,6-dimethylphenyl. | 1-acetyl-2-(2,6-dimethyl-4-tricyanovinylphenyl)-hydrazine. |
| Do | 5,6,7,8-tetrahydro-1-naphthyl. | 1-acetyl-2-(5,6,7,8-tetrahydro-4-tricyanovinyl-1-naphthyl)hydrazine. |
| Do | 5-quinolyl | 1-acetyl-2-(8-tricyanovinyl-5-quinolyl)hydrazine. |
| Do | 8-quinolyl | 1-acetyl-2-(5-tricyanovinyl-8-quinolyl)hydrazine. |
| 4-dihexylaminobutyryl. | 2-bromophenyl | 1-(4-dihexylaminobutyryl)-2-(2-bromo-4-tricyanovinylphenyl)hydrazine. |
| Cyclooctaneacetyl | 5-chloro-2-methoxyphenyl. | 1-(cyclooctaneacetyl)-2-(5-chloro-2-methoxy-4-tricyanovinylphenyl)hydrazine. |
| 2-isopropyl-1-phenethylcyclopentanecarbonyl. | 6-chloro-3-methylphenyl. | 1-(2-isopropyl-1-phenethylcyclopentanecarbonyl)-2-(6-chloro-3-methyl-4-tricyanovinylphenyl)hydrazine. |
| Undecenoyl | Phenyl | 1-undecenoyl-2-(4-tricyanovinylphenyl)hydrazine. |
| 3-bromobenzoyl | do | 1-(3-bromobenzoyl)-2-(4-tricyanovinylphenyl)-hydrazine. |
| 3,3-diphenylbutyryl. | 3-fluorophenyl | 1-(3,3-diphenylbutyryl)-2-(3-fluoro-4-tricyanovinylphenyl)hydrazine. |
| 4-fluorophenylacetyl. | Phenyl | 1-(4-fluorophenylacetyl)-2-(4-tricyanovinylphenyl)-hydrazine. |
| 4-pyridinecarbonyl. | do | 1-(4-pyridinecarbonyl)-2-(4-tricyanovinylphenyl)-hydrazine. |
| 3-iodothiophene-2-carbonyl. | do | 1-(3-iodothiophene-2-carbonyl)-2-(4-tricyanovinylphenyl)hydrazine. |
| 3-indoleacetyl | do | 1-(3-indoleacetyl)-2-(4-tricyanovinylphenyl)-hydrazine. |
| 9-isopropyl-10-anthracenecarbonyl. | 5-fluoro-2-methylphenyl. | 1-(9-isopropyl-10-anthracenecarbonyl)-2-(5-fluoro-2-methyl-4-tricyanovinylphenyl)hydrazine. |
| 2-phenylethanesulfonyl. | 2-iodophenyl | 1-(2-phenylethanesulfonyl)-2-(2-iodo-4-tricyanovinylphenyl)hydrazine. |
| 1-ethylpropanesulfonyl. | Phenyl | 1-(1-ethylpropanesulfonyl)-2-(4-tricyanovinylphenyl)-hydrazine. |
| 3-pyridinesulfonyl | do | 1-(3-pyridinesulfonyl)-2-(4-tricyanovinylphenyl)-hydrazine. |
| Cyclohexanesulfonyl. | do | 1-cyclohexanesulfonyl-2-(4-tricyanovinylphenyl)-hydrazine. |

The use of the products of this invention as dyes may be illustrated as follows:

DYEING EXAMPLE A

Two parts of 1-benzoyl-2-(4-tricyanovinylphenyl)-hydrazine prepared as in Example I is dissolved in 50 parts of acetone and poured into 20,000 parts of water containing 2 parts of a sulfonated lignin dispersant ("Marasperse" CB, Marathon Chemical Company). The pH of this dye dispersion is adjusted to 10 by the addition of a small amount of aqueous sodium hydroxide. Swatches of a composite fabric containing cellulose acetate, nylon, silk, and wool fibers are immersed in the bath and heated at 80–100° C. for one hour. Under these conditions the cellulose acetate is dyed a bright orange-yellow, the nylon a blue-gray, the silk a light tan, and the wool a light tan. Similar results are obtained when the above dyeing is repeated except that the pH of the dispersion is adjusted to 5 by the addition of aqueous hydrochloric acid.

DYEING EXAMPLE B

Twenty parts of 1-acetyl-2-(4-tricyanovinylphenyl)-hydrazine prepared as in Example IV is dissolved in 1580 parts of acetone and poured into a well-stirred solution of 20 parts of a sulfonated lignin dispersant ("Marasperse" CB) in 250,000 parts of water. Swatches of fabric, including cellulose acetate, nylon, silk, and wool, are immersed in dye bath and heated at 80–100° C. for one hour. Cellulose acetate is dyed light orange; nylon is dyed a soft brown; silk is dyed light orange; and wool is dyed orange. Upon exposure in a Fadeometer, the dyed cellulose acetate and wool fabrics show no fading for up to 40 hours.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 1-acyl-2-tricyanovinylarylhydrazines having the formula $$(Acyl)-NH-NH-(arylene)-C(CN)=C(CN)_2$$

wherein the tricyanovinyl group is in the 4-position relative to the hydrazino group in the 1-position of a benzene ring, acyl is an organic radical of no more than 18 carbon atoms and is derived from an acid of the group consisting of carboxylic acids and organic sulfonic acids by removal of the acid hydroxyl group therefrom, and arylene is a radical of not more than 14 carbon atoms and of not more than 3 fused benzene rings having not more than 2 substituents and those selected from the group consisting of chlorine, bromine, lower alkyl, aryl and lower alkoxy.

2. 1-formyl-2-(4-tricyanovinylphenyl)hydrazine.
3. 1-benzoyl-2-(4-tricyanovinylphenyl)hydrazine.
4. 1-acetyl-2-(4-tricyanovinylphenyl)hydrazine.
5. 1 - (4 - toluenesulfonyl)-2-(4-tricyanovinylphenyl)-hydrazine.
6. Process which comprises bringing into intimate contact at a temperature in the range from —80° C. to + 100° C. tetracyanoethylene and an acylarylhydrazine, whereupon 1-acyl-2-tricyanovinylarylhydrazines having the formula $$(Acyl)-NH-NH-(arylene)-C(CN)=C(CN)_2$$

wherein acyl is an organic radical of no more than 18 carbon atoms and is derived from an acid of the group consisting of carboxylic acids and organic sulfonic acids by removal of the acid hydroxyl group therefrom, and arylene is a radical of not more than 14 carbon atoms and of not more than 3 fused benzene rings having not more than 2 substituents and those selected from the group consisting of chlorine, bromine, lower alkyl, aryl and lower alkoxy, are obtained.

7. Process of claim 6 wherein contact between reactants is effected in a liquid medium.

8. Process of claim 6 wherein contact between reactants is effected in the presence of a dialkyl lower alkanoamide.

9. Process of claim 6 wherein the reactants are present in a molar ratio of 1:2 to 2:1 of tetracyanoethylene to the acylarylhydrazine.

References Cited in the file of this patent

UNITED STATES PATENTS 2,762,833    Heckert _____ Sept. 11, 1956

OTHER REFERENCES

Kusick et al.: Journal of the American Chemical Society, June 5, 1958, vol. 80, pp. 2806–2814 (pp. 2807 and 2810 relied on).